| (12) | United States Patent | (10) Patent No.: | US 10,559,993 B2 |
|---|---|---|---|
| | Senoo | (45) Date of Patent: | Feb. 11, 2020 |

(54) STATOR AND MOTOR

(71) Applicant: FANUC CORPORATION, Yamanashi (JP)

(72) Inventor: Tatsuya Senoo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/052,653

(22) Filed: Aug. 2, 2018

(65) Prior Publication Data

US 2019/0052143 A1 Feb. 14, 2019

(30) Foreign Application Priority Data

Aug. 14, 2017 (JP) ................... 2017-156446

(51) Int. Cl.
  *H02K 3/52* (2006.01)
  *H02K 3/18* (2006.01)
  *H02K 1/14* (2006.01)

(52) U.S. Cl.
  CPC ............. *H02K 3/522* (2013.01); *H02K 1/146* (2013.01); *H02K 3/18* (2013.01)

(58) Field of Classification Search
  CPC .. H02K 3/00; H02K 3/18; H02K 3/30; H02K 3/32; H02K 3/325; H02K 3/34;
  (Continued)

(56) References Cited

U.S. PATENT DOCUMENTS 9,350,209 B2 * 5/2016 Murakami ............ H02K 3/522
9,641,029 B2 * 5/2017 Kreidler ................ H02K 1/148
(Continued)

FOREIGN PATENT DOCUMENTS

| CN | 105553153 A | 5/2016 |
|---|---|---|
| JP | 2008-259367 A | 10/2008 |

(Continued)

OTHER PUBLICATIONS

An Office Action mailed by the Japanese Patent Office dated Apr. 9, 2019, which corresponds to Japanese Patent Application No. 2017-156446 and is related to U.S. Appl. No. 16/052,653; with English translation.
An Office Action mailed by the State Intellectual Property Office of the People's Republic of China dated Oct. 30, 2019, which corresponds to Chinese Patent Application No. CN201810911709.5 and is related to U.S. Appl. No. 16/052,653.

*Primary Examiner* — Tran N Nguyen
(74) *Attorney, Agent, or Firm* — Studebaker & Brackett PC (57) ABSTRACT

A first coil fixing component has a first body portion inserted into a first void portion formed between a coil and a first end surface of a tooth portion, a first convex portion inserted into a first concave portion of the tooth portion, and a first locking portion extending from an end on an inner side of a radial direction of the first body portion toward the opposite side of the first end surface to lock the coil. A second coil fixing component has a second body portion inserted into a second void portion formed between the coil and a second end surface of the tooth portion, a second convex portion inserted into the second concave portion of the tooth portion, and a second locking portion extending from an end on the inner side of the radial direction of the second body portion toward the opposite side of the second end surface to lock the coil. The second body portion has an elastic structure that exerts elastic force in an axial direction.

4 Claims, 11 Drawing Sheets

(58) Field of Classification Search
CPC ............ H02K 3/345; H02K 3/37; H02K 3/46;
H02K 3/50; H02K 3/52; H02K 3/522;
H02K 15/00; H02K 15/02; H02K 15/06;
H02K 15/066; H02K 15/08; H02K 15/09;
H02K 15/095; H02K 15/12; H02K 9/00;
H02K 9/22
See application file for complete search history.

(56) References Cited

U.S. PATENT DOCUMENTS 9,653,957 B2 * 5/2017 Senoo .................... H02K 3/522
9,948,166 B2 * 4/2018 Kino ....................... B29C 45/16

FOREIGN PATENT DOCUMENTS

| JP | 2010-246269 A | 10/2010 | | |
|---|---|---|---|---|
| JP | 2011135640 | * | 7/2011 | ............... H02K 3/34 |
| JP | 2012060747 | * | 3/2012 | ............... H02K 15/12 |
| JP | 5977311 B2 | | 7/2016 | |

* cited by examiner

FIG. 9 ated on 14 Aug. 2017, the content of which is incorporated
STATOR AND MOTOR

This application is based on and claims the benefit of priority from Japanese Patent Application No. 2017-156446, filed on 14 Aug. 2017, the content of which is incorporated herein by reference.

BACKGROUND OF THE INVENTION

Field of the Invention

The present invention relates to a stator and a motor.

Related Art

Conventionally, a coil fixing component which fixes to a stator core of a stator and which can be used in common to motors of different sizes and which has a simple structure is known (for example, see Patent Document 1). This coil fixing component has a projection to be inserted into an insertion hole formed in the stator core and can be attached to the stator core by inserting the projection into the insertion hole of the stator core.

Patent Document 1: Japanese Patent No. 5977311

SUMMARY OF THE INVENTION

According to the coil fixing component disclosed in Patent Document 1, the workability of fixing the coil fixing component itself to the stator core is improved. However, this coil fixing component does not improve the workability of fixing coils to the stator core.

An object of the present invention is to provide a stator and a motor having a coil fixing component capable of improving the workability of fixing coils to a stator core.

(1) The present invention relates to a stator (for example, a stator 1 to be described later) including: a stator core (10) having a cylindrical yoke portion (for example, a yoke portion 11 to be described later) and a plurality of tooth portions (for example, a tooth portion 12 to be described later) protruding toward an inner side of a radial direction (for example, a radial direction D3 to be described later) of the yoke portion from positions spaced from each other in a circumferential direction (for example, a circumferential direction D2 to be described later) of an inner circumferential portion of the yoke portion and extending in an axial direction (for example, an axial direction D1 to be described later) of the yoke portion; a plurality of coils (for example, a coil 20 to be described later) attached to the tooth portion so as to surround the tooth portion, the coils forming a first void portion (for example, a first void portion SP1 to be described later) between an inner circumferential portion (for example, an inner circumferential portion 20a to be described later) of the coil and a first end surface (for example, a first end surface 12a to be described later) on one end side in the axial direction of the tooth portion and forming a second void portion (for example, a second void portion SP2 to be described later) between the inner circumferential portion of the coil and a second end surface (for example, a second end surface 12b to be described later) on the other end side in the axial direction of the tooth portion; a plurality of first coil fixing components (for example, a first coil fixing component 30, 30A, 30B to be described later) inserted into the first void portion from an inner side of the radial direction toward an outer side thereof to fix the coils; and a plurality of second coil fixing components (for example, a second coil fixing component 40 to be described later) inserted into the second void portion from the inner side of the radial direction toward the outer side to fix the coils, wherein the first end surface has a first concave portion (for example, a through-hole 13 to be described later), the second end surface has a second concave portion (for example, a through-hole 13 to be described later), the first coil fixing component has a first body portion (for example, a first body portion 31 to be described later) inserted into the first void portion, a first convex portion (for example, a first convex portion 32 to be described later) protruding from a position contacting the first end surface, of the first body portion so as to be inserted into the first concave portion, and a first locking portion (for example, a first locking portion 33 to be described later) extending from an end on the inner side of the radial direction of the first body portion toward the opposite side of the first end surface to lock the coil from the inner side of the radial direction, the second coil fixing component has a second body portion (for example, a second body portion 41 to be described later) inserted into the second void portion, a second convex portion (for example, a second convex portion 42 to be described later) protruding from a position contacting the second end surface, of the second body portion so as to be inserted into the second concave portion, and a second locking portion (for example, a second locking portion 43 to be described later) extending from an end on the inner side of the radial direction of the second body portion toward the opposite side of the second end surface to lock the coil from the inner side of the radial direction, and at least one of the first body portion and the second body portion has an elastic structure that exerts elastic force in the axial direction.

(2) In the stator according to (1), the first body portion may have a first guiding portion (for example, a first guiding portion 31a to be described later) that guides insertion into the first void portion, and the second body portion may have a second guiding portion (for example, a second guiding portion 41a to be described later) that guides insertion into the second void portion.

(3) In the stator according to (2), the first convex portion may have a first auxiliary guiding portion (for example, a first auxiliary guiding portion 32a to be described later) that assists guiding of the first body portion (31) toward the first void portion by the first guiding portion, or the second convex portion may have a second auxiliary guiding portion that assists guiding of the second body portion toward the second void portion by the second guiding portion.

(4) In the stator according to any one of (1) to (3), any one (for example, a second body portion 41 to be described later) of the first body portion and the second body portion may have the elastic structure, and the other one (for example, a first body portion 31 to be described later) of the first body portion and the second body portion may not substantially have the elastic structure.

(5) The present invention provides a motor including: the stator according to any one of (1) to (4); and a rotor disposed on an inner side of the stator.

According to the present invention, it is possible to provide a stator and a motor having a coil fixing component capable of improving the workability of fixing coils to a stator core.

DETAILED DESCRIPTION OF THE INVENTION

Figure 1:
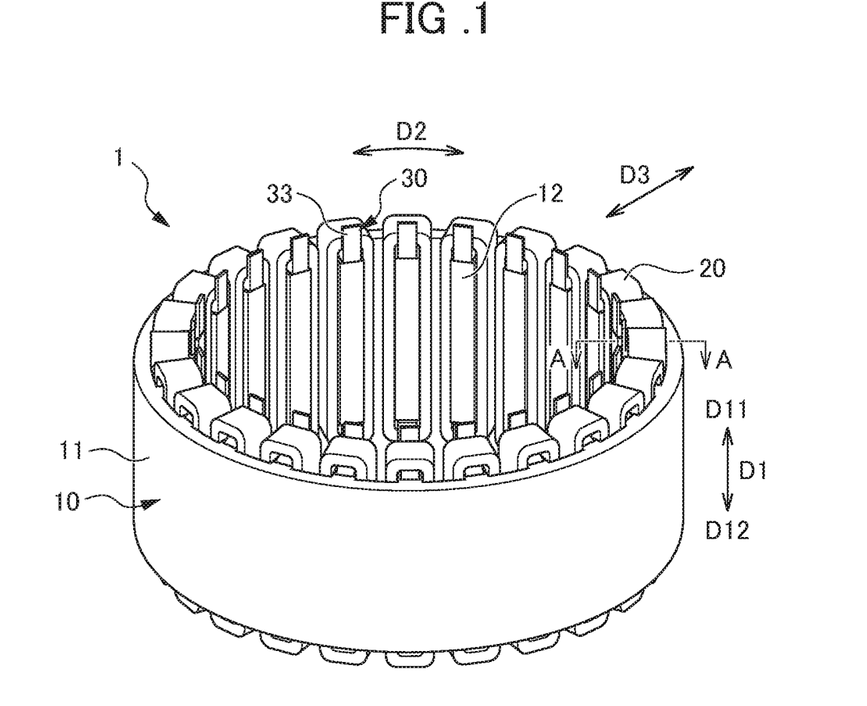
FIG. 1 is a perspective view when a stator according to an embodiment of the present invention is seen obliquely from above.
Figure 2:
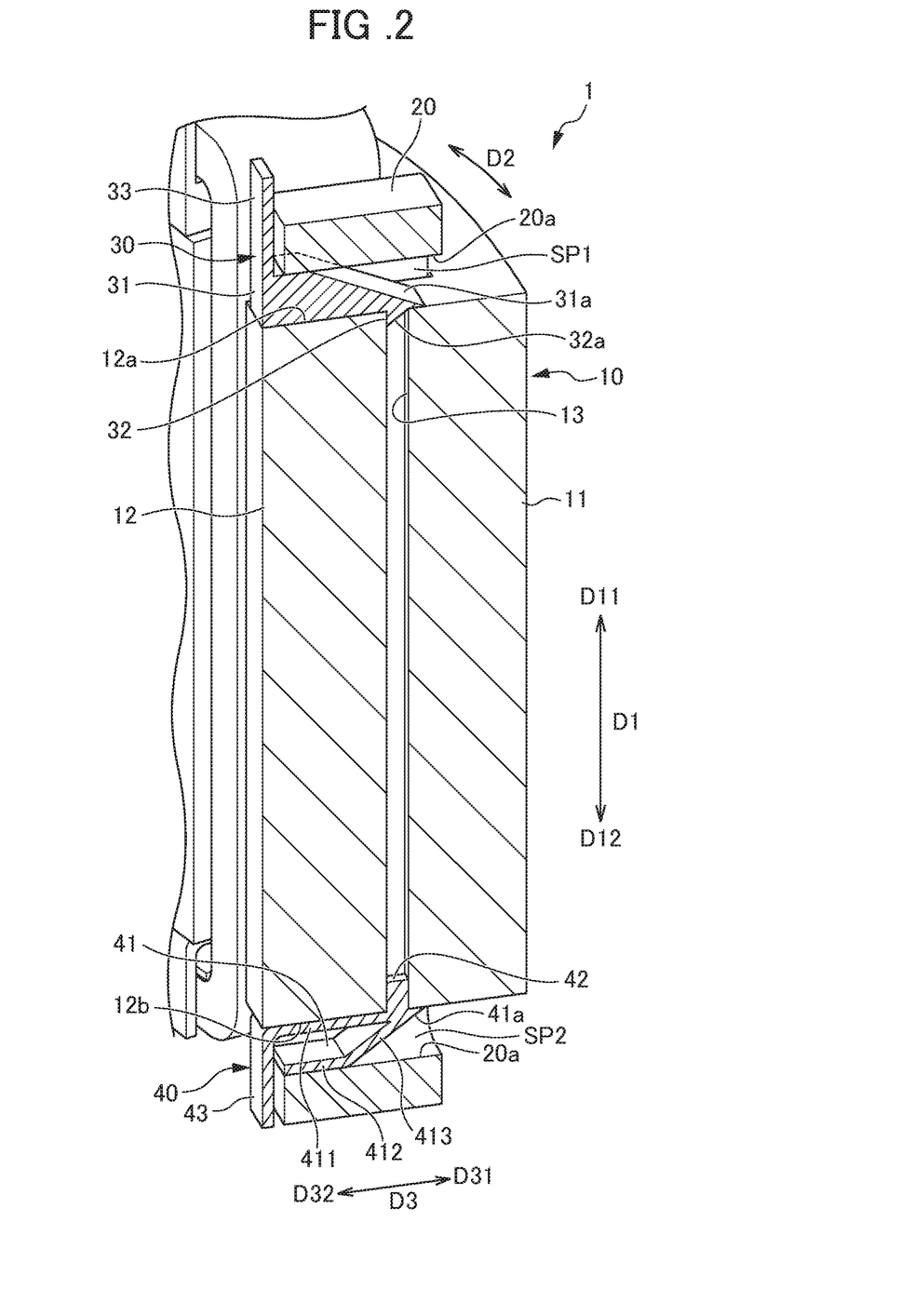
FIG. 2 is a partial cross-sectional view along line A-A in FIG. 1.
Figure 3A:
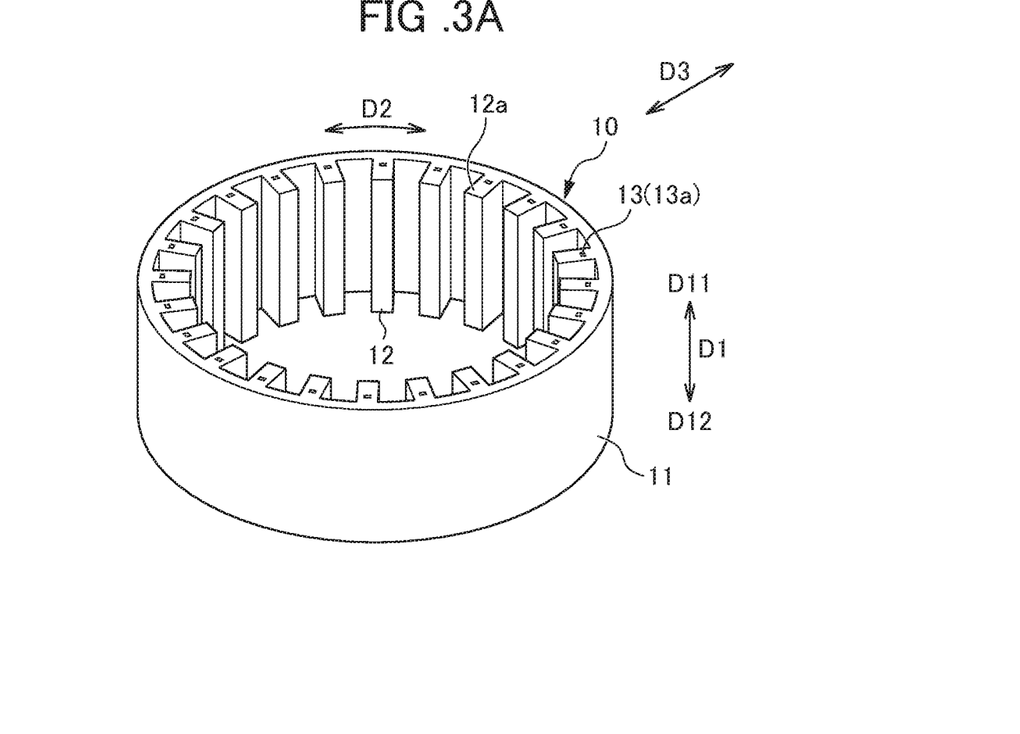
FIG. 3A is a perspective view when a stator core included in the stator according to the embodiment is seen obliquely from above.
Figure 3B:
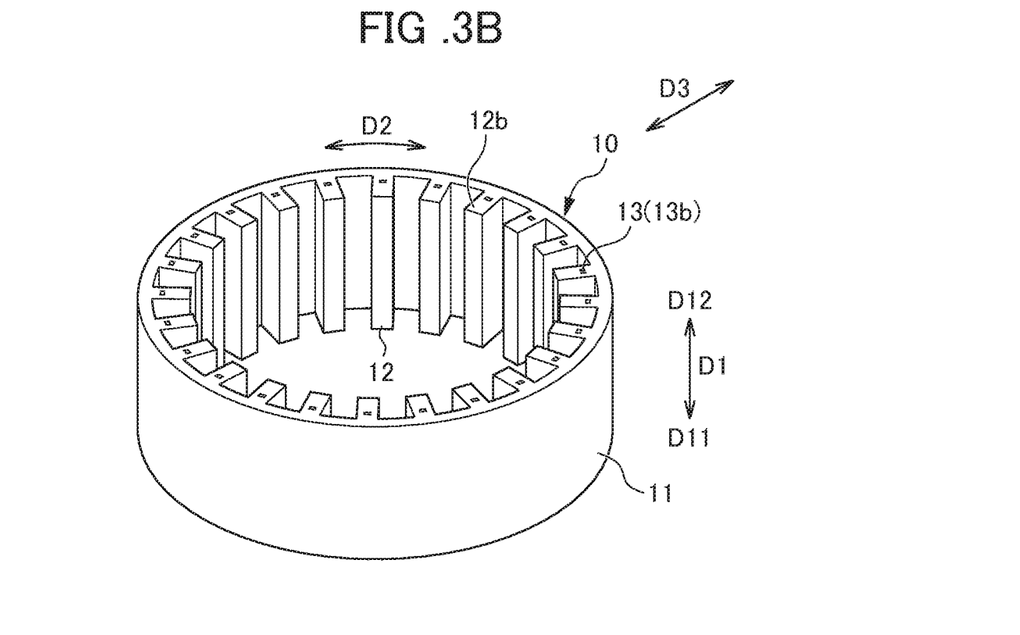
FIG. 3B is a perspective view when the stator core included in the stator according to the embodiment is seen obliquely from below.
Figure 4:
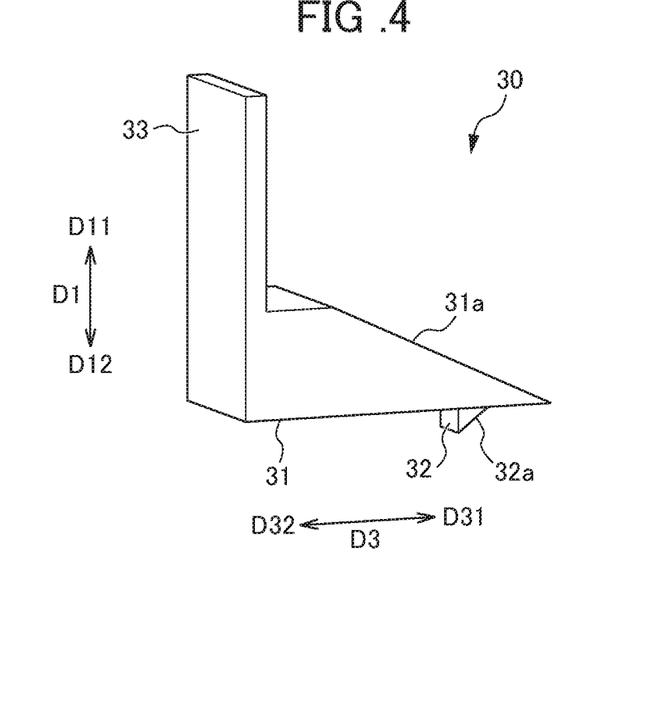
FIG. 4 is a perspective view of a first coil fixing component included in the stator according to the embodiment.
Figure 5:
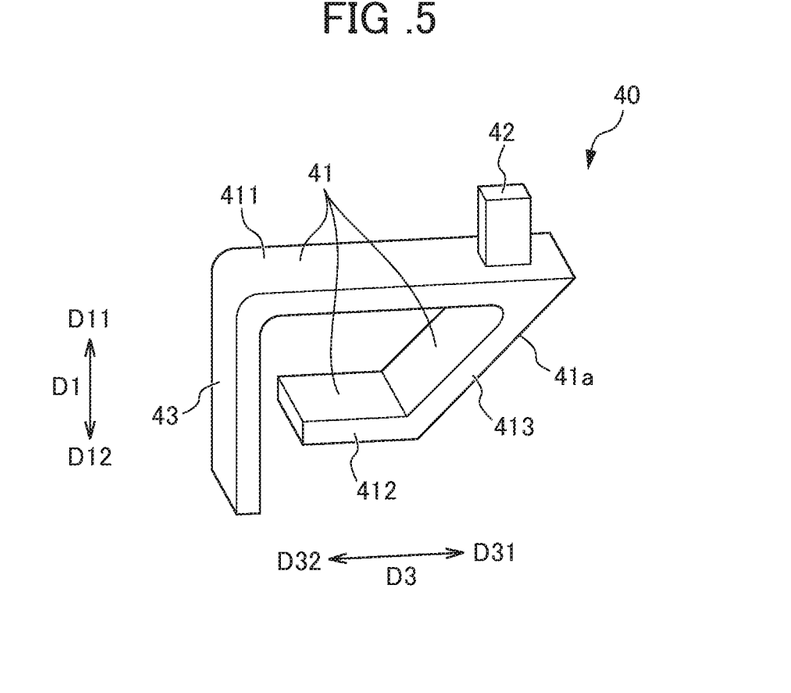
FIG. 5 is a perspective view of a second coil fixing component included in the stator according to the embodiment.

Hereinafter, an embodiment of a stator 1 and a motor according to the present invention will be described with reference to FIGS. 1 to 5. FIG. 1 is a perspective view when the stator 1 according to an embodiment of the present invention is seen obliquely from above. FIG. 2 is a partial cross-sectional view along line A-A in FIG. 1. FIG. 3A is a perspective view when a stator core 10 included in the stator 1 according to the embodiment is seen obliquely from above. FIG. 3B is a perspective view when the stator core 10 included in the stator 1 according to the embodiment is seen obliquely from below. FIG. 4 is a perspective view of a first coil fixing component 30 included in the stator 1 according to the embodiment. FIG. 5 is a perspective view of a second coil fixing component 40 included in the stator 1 according to the embodiment.

As illustrated in FIGS. 1 and 2, the stator 1 of the present embodiment forms a motor together with a rotor (not illustrated) disposed on the inner side of the stator 1. The motor formed by the stator 1 of the present embodiment is a squirrel-cage induction motor. The stator 1 includes a stator core 10, a plurality of coils 20, a plurality of first coil fixing components 30, and a plurality of second coil fixing components 40.

As illustrated in FIGS. 3A and 3B, the stator core 10 is formed by stacking electromagnetic steel sheets in an axial direction D1. The stator core 10 has a yoke portion 11 and a plurality of tooth portions 12.

The yoke portion 11 is cylindrical. The plurality of tooth portions 12 protrudes toward the inner side in a radial direction D3 of the yoke portion 11 from positions spaced from each other in a circumferential direction D2 in the inner circumferential portion of the yoke portion 11. Moreover, the tooth portion 12 extends in the axial direction D1 of the yoke portion 11 and specifically has a length extending from one end to the other end of the yoke portion 11.

The plurality of tooth portions 12 each have an approximately rectangular parallelepiped shape and have a through-hole 13. The through-hole 13 passes through a first end surface 12a on one end side of the axial direction D1 of the tooth portion 12 and a second end surface 12b on the other end side. A portion 13a (see FIG. 3A) of the through-hole 13 exposed to the first end surface 12a functions as a first concave portion to which a first convex portion 32 of the first coil fixing component 30 is inserted. A portion 13b (see FIG. 3B) of the through-hole 13 exposed to the second end surface 12b functions as a second concave portion to which a second convex portion 42 of the second coil fixing component 40 is inserted.

A direction from the second end surface 12b to the first end surface 12a in relation to the axial direction D1 is also referred to as a "first axial direction D11" and the opposite direction is also referred to as a "second axial direction D12". A direction from the inner side to the outer side in relation to the radial direction D3 is also referred to as an "outer radial direction D31" and the opposite direction is also referred to as an "inner radial direction D32".

Description will be provided by referring to FIGS. 1 and 2 again. The plurality of coils 20 is attached to the tooth portion 12 so as to surround the tooth portion 12 of the stator core 10. Since an adhesive is applied to the circumference of a wire that forms the coil 20, the coil 20 formed by winding the wires is maintained generally in an annular form. The coil 20 attached to the tooth portion 12 forms a first void portion SP1 between the inner circumferential portion 20a of the coil 20 and the first end surface 12a of the tooth portion 12 and a second void portion SP2 between the inner circumferential portion 20a of the coil 20 and the second end surface 12b of the tooth portion 12. The first void portion SP1 serves as a void in which the first coil fixing component 30 is inserted. The second void portion SP2 serves as a void in which the second coil fixing component 40 is inserted.

As illustrated in FIGS. 2 and 4, the first coil fixing component 30 is inserted into the first void portion SP1 from the inner side of the radial direction D3 toward the outer side (in the outer radial direction D31) to fix the coil 20 attached to the tooth portion 12 of the stator core 10. Specifically, the first coil fixing component 30 has a first body portion 31, a first convex portion 32, and a first locking portion 33.

The first body portion 31 has a first guiding portion 31a at a position on the outer side of the radial direction D3 and the outer side of the axial direction D1 (the side of the outer radial direction D31 and the side of the first axial direction D11). The first guiding portion 31a has a tapered shape that is tapered toward the outer side of the radial direction D3 and guides insertion into the first void portion SP1. The expression "guide insertion" refers to improving insertion properties and decreasing insertion resistance. The first convex portion 32 protrudes toward the inner side of the axial direction D1 (toward the second axial direction D12) from the position contacting the first end surface 12a, of the first body portion 31 inserted into the first void portion SP1 and is inserted into the through-hole 13. The inserted first convex portion 32 engages with or is fitted to the through-hole 13 depending on an attachment state of the coil 20.

The first convex portion 32 has a first auxiliary guiding portion 32a. The first auxiliary guiding portion 32a has an approximately triangular shape in a side view such that the outer side of the radial direction D3 and the inner side of the axial direction D1 (the side of the outer radial direction D31 and the side of the second axial direction D12) are inclined.

The first auxiliary guiding portion 32a assists guiding of the first body portion 31 to the first void portion SP1 by the first guiding portion 31a. The first locking portion 33 is a locking piece that extends from the inner end in the radial direction D3 of the first body portion 31 toward the opposite side (the outer side of the axial direction D1) of the first end surface 12a to lock the coil 20 from the inner side of the radial direction D3. The first body portion 31 does not substantially have an elastic structure (to be described later) included in a second body portion 41.

As illustrated in FIGS. 2 and 5, the second coil fixing component 40 is inserted into the second void portion SP2 from the inner side of the radial direction D3 toward the outer side to the coil 20 attached to the tooth portion 12 of the stator core 10. Specifically, the second coil fixing component 40 has a second body portion 41, a second convex portion 42, and a second locking portion 43.

The second body portion 41 has an elastic structure that exerts elastic force in the axial direction D1. Specifically, the second body portion 41 has such a shape that two parallel plate portions 411 and 412 are connected to another plate portion 413 with a gap therebetween. Due to this, the second body portion 41 has elasticity in the axial direction D1 even when a rigid resin is used as a material that endures high temperature. The second body portion 41 has a second guiding portion 41a at a position (in the plate portion 413) on the outer side of the radial direction D3 and the outer side (the side of the second axial direction D12) of the axial direction D1. The second guiding portion 41a has a tapered shape that is tapered toward the outer side of the radial direction D3 and guides insertion of the second body portion 41 into the second void portion SP2.

The second convex portion 42 protrudes toward the inner side of the axial direction D1 from a position contacting the second end surface 12b of the second body portion 41 inserted into the second void portion SP2 and is inserted into the through-hole 13. The inserted second convex portion 42 engages with and is fitted to the through-hole 13 depending on an attachment state of the coil 20. The second convex portion 42 is rectangular in a side view and does not have an auxiliary guiding portion unlike the first convex portion 32. The second locking portion 43 is a locking piece that extends from the inner end in the radial direction D3 of the second body portion 41 toward the opposite side (the outer side of the axial direction D1) of the second end surface 12b to lock the coil 20 from the inner side of the radial direction D3.

In a state in which all coils 20 are fixed by the first and second coil fixing components 30 and 40, all coils 20 are collected and pressed by a disk-shaped member (not illustrated) or are secured by a resin mold (not illustrated), whereby the coils 20 are bound.

Figure 6A:
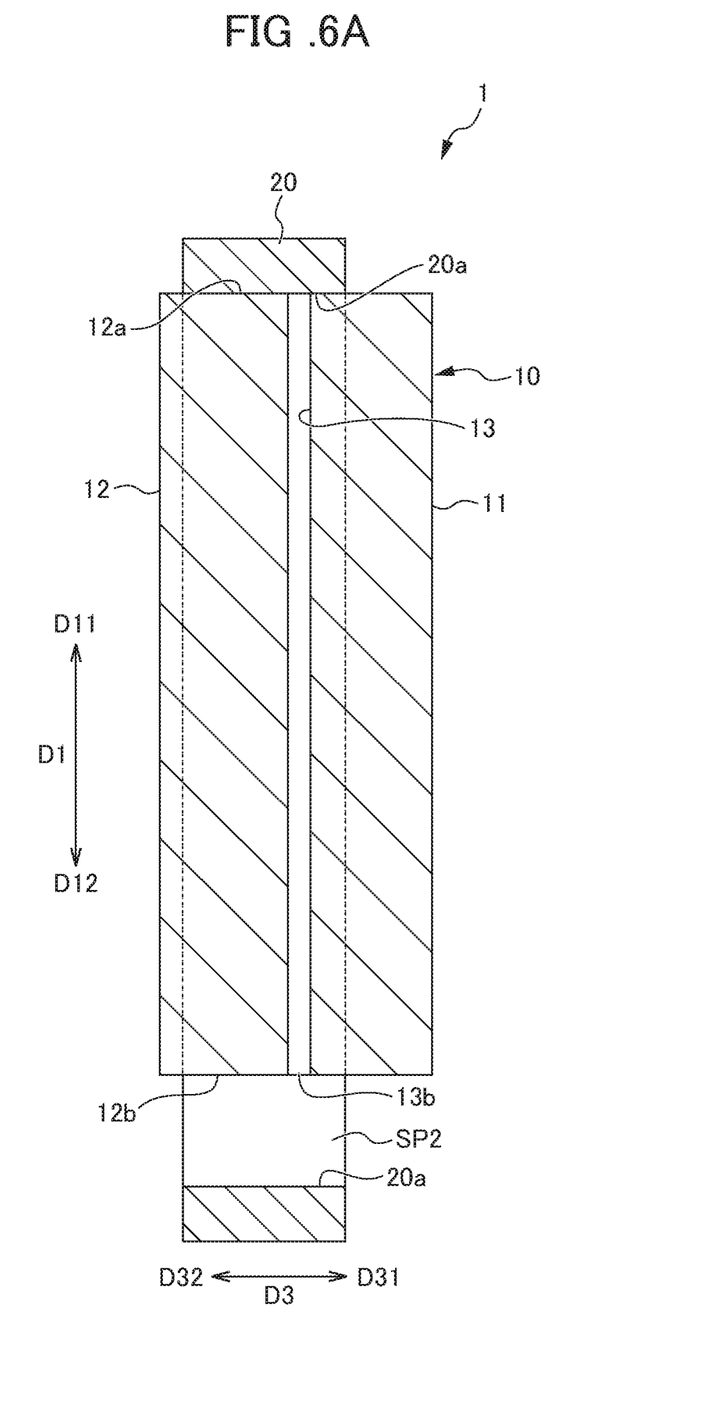
FIG. 6A is a diagram for describing steps of attaching the first and second coil fixing components sequentially.
Figure 6B:
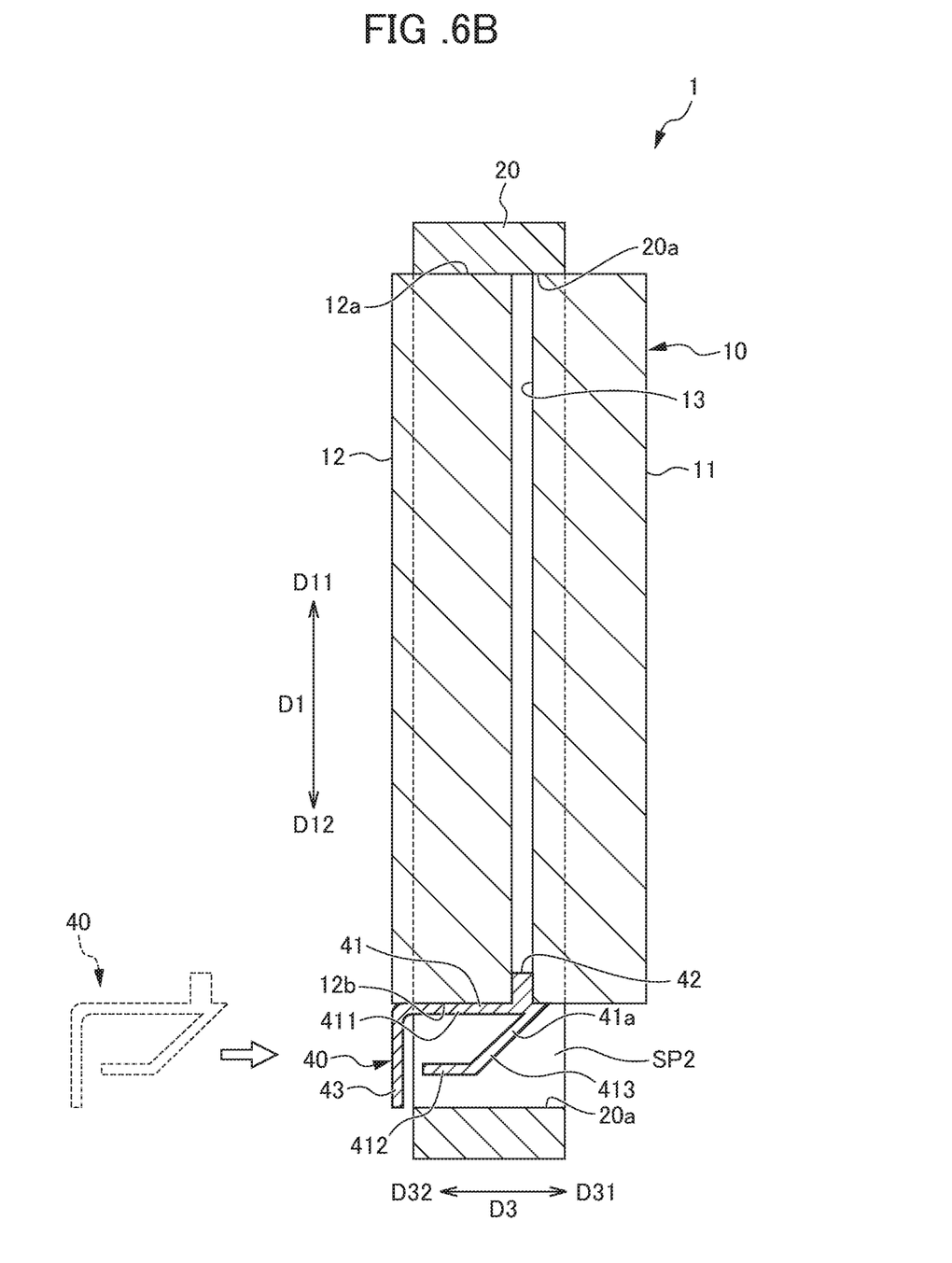
FIG. 6B is a diagram for describing steps of attaching the first and second coil fixing components sequentially.
Figure 6C:
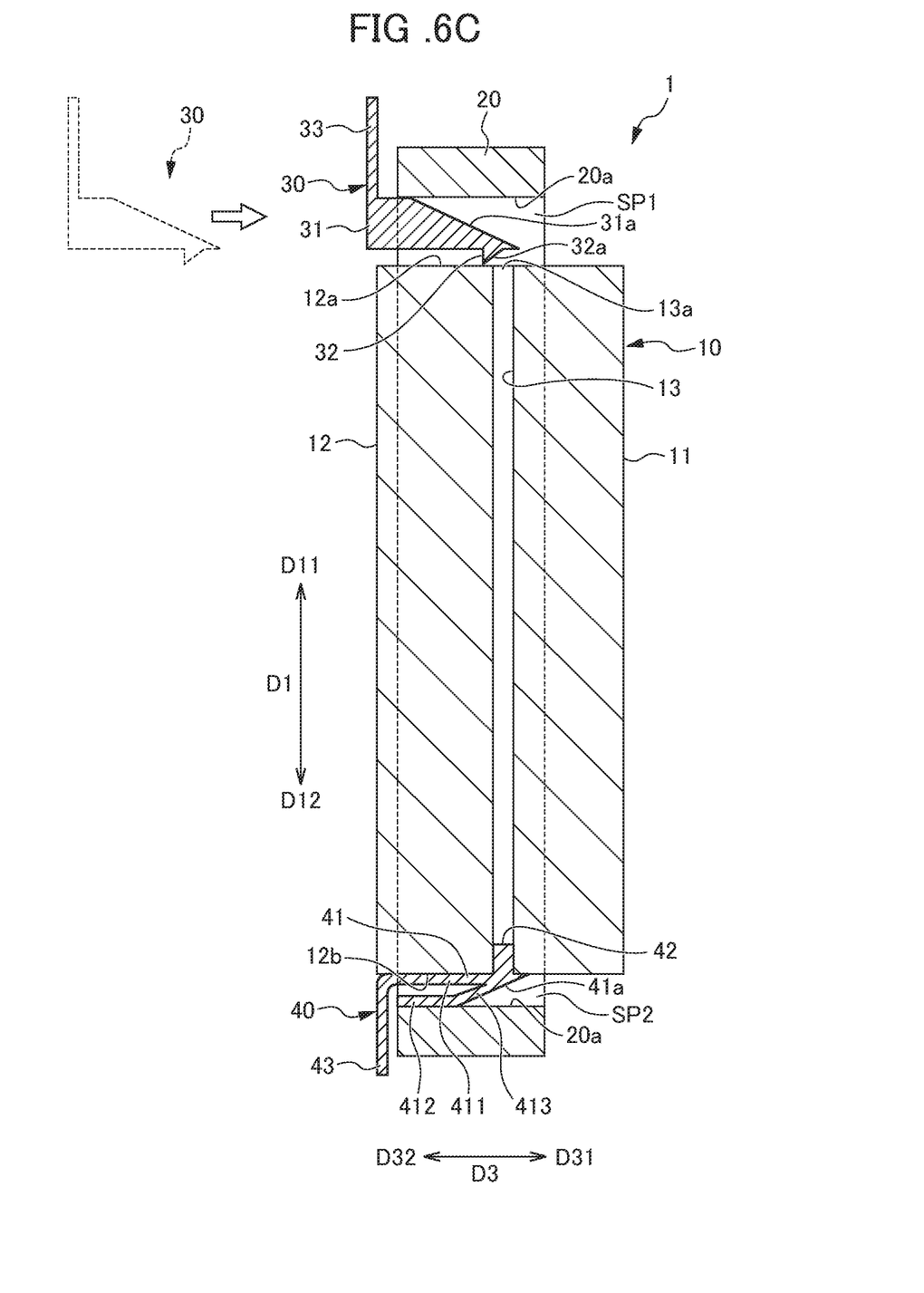
FIG. 6C is a diagram for describing steps of attaching the first and second coil fixing components sequentially.

Next, the order of assembling the stator 1 will be described. FIGS. 6A to 6C are diagrams for describing the steps of attaching the first and second coil fixing components sequentially. First, the coils 20 are fitted to the plurality of tooth portions 12 of the stator core 10 from the inner side of the radial direction D3 toward the outer side (in the outer radial direction D31) whereby the coils 20 are attached. Subsequently, as illustrated in FIG. 6A, the coils 20 are arranged so that a large second void portion 502 is formed between the inner circumferential portion 20a of the coil 20 and the second end surface 12b of the tooth portion 12.

As illustrated in FIG. 6B, the second coil fixing component 40 is inserted into the second void portion SP2 from the inner side of the radial direction D3 toward the outer side (in the outer radial direction D31). In this insertion process, insertion properties are enhanced by the second guiding portion 41a. The second convex portion 42 is inserted into the portion 13b (see FIG. 6A) of the through-hole 13 close to the second end surface 12b. Subsequently, as illustrated in FIG. 6C, the first coil fixing component 30 is inserted into the first void portion SP1 formed between the inner circumferential portion. 20a of the coil 20 and the first end surface 12a of the tooth portion 12 from the inner side of the radial direction D3 toward the outer side (in the outer radial direction D31). In the insertion process, the insertion properties are enhanced by the first guiding portion 31a and the first auxiliary guiding portion 32a. The first convex portion 32 is inserted into the portion 13a of the through-hole 13 close to the first end surface 12a.

In the process in which the first coil fixing component 30 is inserted into the first void portion SP1, as illustrated in FIG. 6C, the second body portion 41 of the second coil fixing component 40 inserted into the second void portion SP2 contracts in the axial direction D1 and the first void portion SP1 expands. When insertion of the first coil fixing component 30 into the first void portion SP1 is completed, as illustrated in FIG. 2, the second body portion 41 of the second coil fixing component 40 contracted in the axial direction D1 expands in the axial direction D1 to restore its original shape. In this way, the first coil fixing component 30 can be easily inserted into the first void portion SP1. As a result, the coil 20 can be easily fixed to the stator core 10.

Figure 7A:
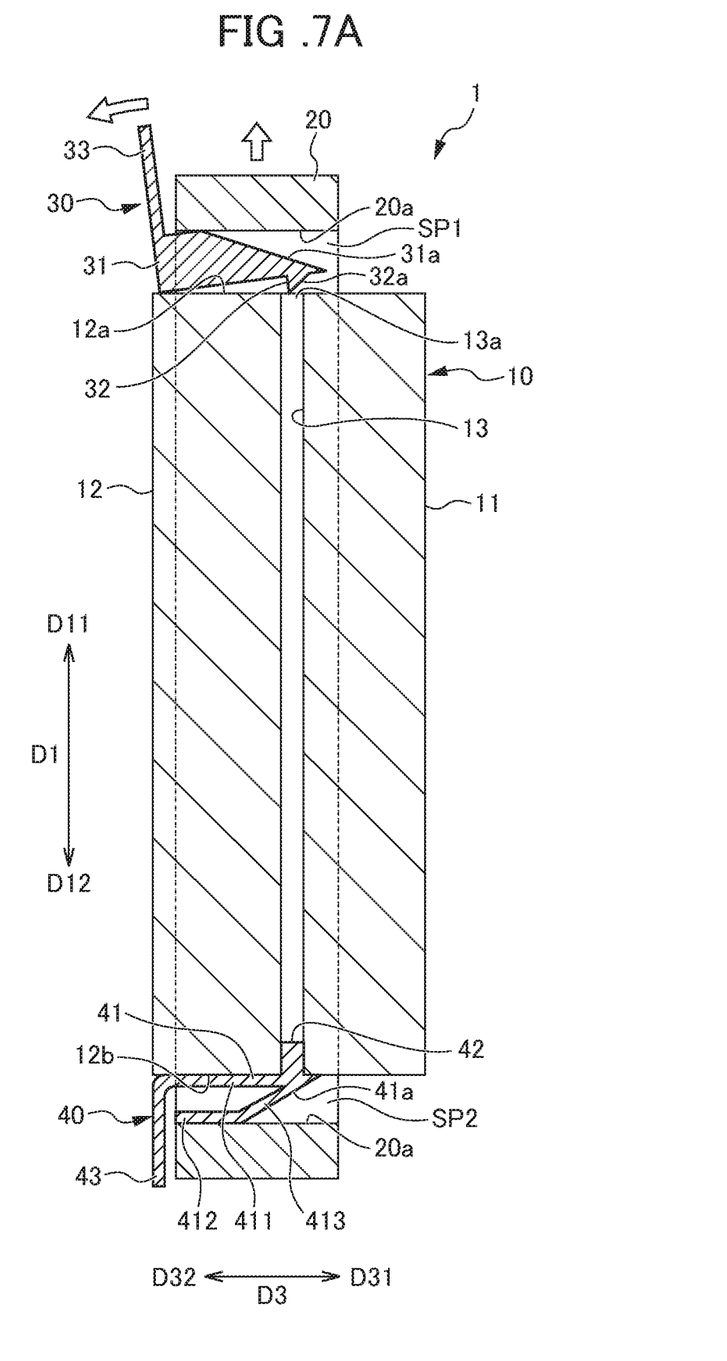
FIG. 7A is a diagram for describing steps of removing the first coil fixing component sequentially.
Figure 7B:
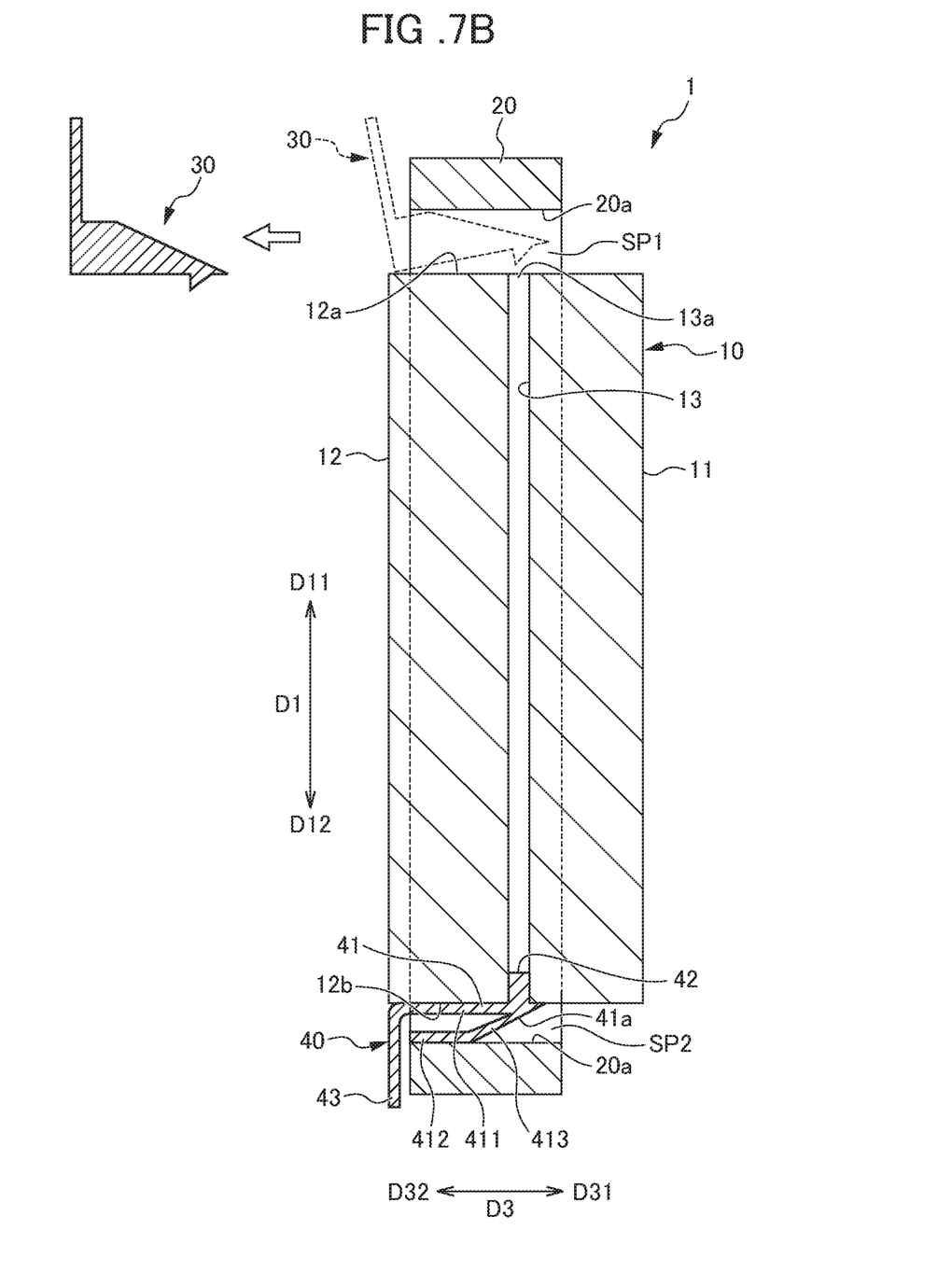
FIG. 7B is a diagram for describing steps of removing the first coil fixing component sequentially.
Figure 7C:
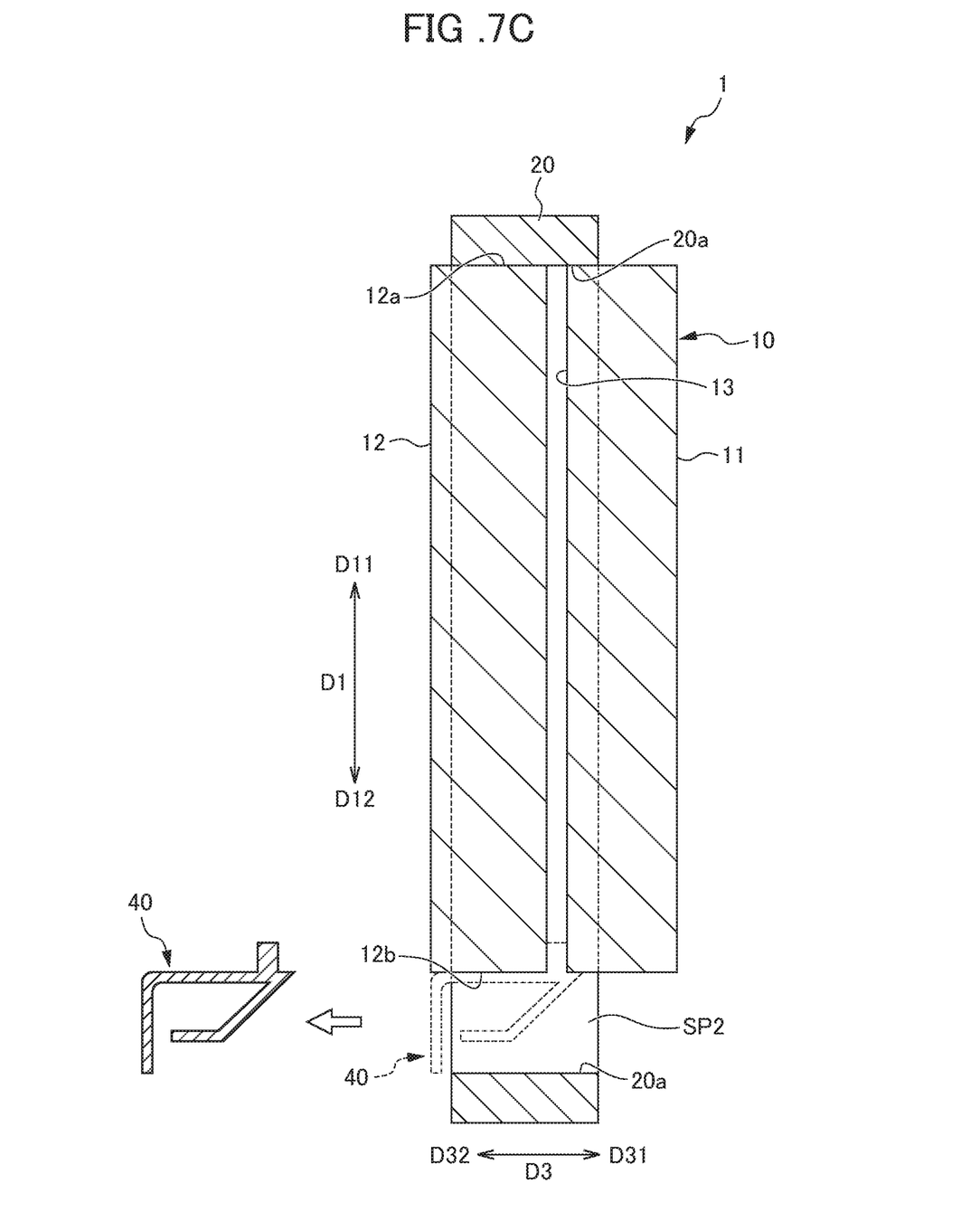
FIG. 7C is a diagram for describing steps of removing the first coil fixing component sequentially.

Next, the order of an operation of removing the coil 20 from the stator 1 will be described with reference to FIGS. 7A to 7C. FIGS. 7A to 7C are diagrams for describing steps of removing the first coil fixing component sequentially. An operation of removing the coils 20 is performed when a problem occurs in a manufacturing process and it is necessary to remove the coils 20 and perform correction.

As illustrated in FIG. 7A, first, a distal end of the first locking portion 33 of the first coil fixing component 30 is pulled toward the inner side (in the inner radial direction D32) of the radial direction D3, whereby the first body portion 31 of the first coil fixing component 30 pivots about the inner side of the radial direction D3. In this way, the first convex portion 32 of the first coil fixing component 30 is removed from the portion 13a of the through-hole 13 and the coil 20 moves in the first axial direction D11. Since the first auxiliary guiding portion 32a is provided in the first convex portion 32 (the first convex portion 32 is not rectangular in a side view but is notched), the first convex portion 32 is easily removed from the through-hole 13. The coil 20 is raised toward the outer side of the axial direction D1, whereby the second body portion 41 of the second coil fixing component 40 inserted into the second void portion SP2 contracts in the axial direction D1.

Subsequently, as illustrated in FIG. 7B, in a state in which the first convex portion 32 of the first coil fixing component 30 is removed from the through-hole 13 and the coil 20 is moved in the first axial direction D11, the first coil fixing component 30 is removed toward the inner side (in the inner radial direction D32) of the radial direction D3 from the first void portion SP1. As illustrated in FIG. 7C, after the coil 20 is moved in the second axial direction D12, the second coil fixing component 40 is removed toward the inner side of the radial direction. D3 from the second void portion SP2 and the coil 20 is removed toward the inner side of the radial direction D3 from the tooth portion 12. In this way, it is possible to remove the coil 20 easily.

According to the stator 1 and the motor of the present embodiment, the following advantageous effects are obtained, for example. The stator 1 of the present invention includes: the stator core 10 having the cylindrical yoke portion 11 and the plurality of tooth portions 12 protruding toward the inner side of the radial direction D3 of the yoke portion 11 from positions spaced from each other in the circumferential direction D2 of an inner circumferential portion of the yoke portion 11 and extending in the axial direction D1 of the yoke portion 11; the plurality of coils 20 attached to the tooth portion 12 so as to surround the tooth portion 12, the coils 20 forming the first void portion SP1 between the inner circumferential portion 20a of the coil 20 and the first end surface 12a on one end side in the axial direction D1 of the tooth portion 12 and forming the second void portion SP2 between the inner circumferential portion 20a of the coil 20 and the second end surface 12b on the other end side in the axial direction D1 of the tooth portion 12; the plurality of first coil fixing components 30 inserted into the first void portion SP1 from the inner side of the radial direction D3 toward the outer side thereof to fix the coils 20; and the plurality of second coil fixing components 40 inserted into the second void portion SP2 from the inner side of the radial direction. D3 toward the outer side to fix the coils 20. The first end surface 12a has the through-hole 13, the second end surface 12b has the through-hole 13, the first coil fixing component 30 has the first body portion 31 inserted into the first void portion SP1, the first convex portion 32 protruding from a position contacting the first end surface 12a of the first body portion 31 so as to be inserted into the through-hole 13, and the first locking portion 33 extending from the end on the inner side of the radial direction D3 of the first body portion 31 toward the opposite side of the first end surface 12a to lock the coil 20 from the inner side of the radial direction D3, the second coil fixing component 40 has the second body portion. 41 inserted into the second void portion SP2, the second convex portion 12 protruding from a position contacting the second end surface 12b, of the second body portion 41 so as to be inserted into the through-hole 13, and the second locking portion 43 extending from the end on the inner side of the radial direction D3 of the second body portion 41 toward the opposite side of the second end surface 12b to lock the coil 20 from the inner side of the radial direction D3, and the second body portion 41 has an elastic structure that exerts elastic force in the axial direction D1.

Therefore, after the coils 20 are fitted respectively to the plurality of tooth portions 12 of the stator core 10 and the second coil fixing component 40 is inserted into the second void portion SP2 formed between the inner circumferential portion 20a of the coil 20 and the second end surface 12b of the tooth portion 12, when the first coil fixing component 30 is inserted into the first void portion SP1 formed between the inner circumferential portion 20a of the coil 20 and the first end surface 12a of the tooth portion 12, since the second body portion 41 of the second coil fixing component 40 contracts in the axial direction D1, the first coil fixing component 30 can be easily inserted into the first void portion SP1. In this way, the coil 20 can be easily fixed to the stator core 10. Since it is possible to fix the coil 20 with this simple operation, the workability of fixing the coil 20 to the stator core 10 is improved.

After the distal end of the first locking portion 33 of the first coil fixing component 30 is pulled to pivot the first body portion 31 and the first coil fixing component 30 is removed from the first void portion SP1, by pressing the coil 20 in the axial direction D1 to remove the second coil fixing component 40 from the second void portion SP2 simply, it is possible to remove the coil 20 from the tooth portion 12 easily.

The first body portion 31 has the first guiding portion 31a that guides insertion into the first void portion SP1 and the second body portion 41 has the second guiding portion 41a that guides insertion into the second void portion SP2. Therefore, the insertion of the first coil fixing component 30 into the first void portion SP1 is made easy and the insertion of the second coil fixing component 40 into the second void portion SP2 is made easy.

The first convex portion 32 has the first auxiliary guiding portion 32a that assists guiding of the first body portion 31 toward the first void portion SP1 by the first guiding portion 31a. Therefore, insertion of the first coil fixing component 30 into the first void portion SP1 is made easier.

The first body portion 31 of the first coil fixing component 30 does not substantially has elasticity in the axial direction D1 unlike the second body portion 41 of the second coil fixing component 40. Due to this, it is easy to equalize the heights of the ends close to the first coil fixing component 30 of the coil 20, and the quality can be stabilized.

The present invention is not limited to the above-described embodiment and various changes and modifications can be made. For example, in the above-described embodiment, although the second body portion 41 of the second coil fixing component 40 has elasticity in the axial direction D1, the present invention is not limited thereto. That is, the first body portion 31 of the first coil fixing component 30 may have elasticity in the axial direction D1 or both body portions may have elasticity in the axial direction D1.

In the above-described embodiment, although the first convex portion 32 of the first coil fixing component 30 has the first auxiliary guiding portion 32a that assists guiding of the first body portion 31 toward the first void portion SP1 by the first guiding portion 31a, the present invention is not limited thereto. That is, instead of the first convex portion 32 of the first coil fixing component 30 having the first auxiliary guiding portion 32a or in addition to the first convex portion 32 of the first coil fixing component 30 having the first auxiliary guiding portion 32a, the second convex portion 42 of the second coil fixing component 40 may have a second auxiliary guiding portion that assists guiding of the second body portion 41 toward the second void portion SP2 by the second guiding portion 41a. The guiding portion and the auxiliary guiding portion is not limited to a tapered shape but may have a curved shape.

Next, a stator according to another embodiment (a modified embodiment) will be described with reference to FIG. 8. In description of the modified embodiment, the same components as those of the stator 1 illustrated in FIG. 1 will be denoted by the same reference numerals and the description thereof will be omitted. In description of the modified embodiment, description of the same advantageous effects as the those of the stator 1 illustrated in FIG. 1 will not be provided.

Figure 8:
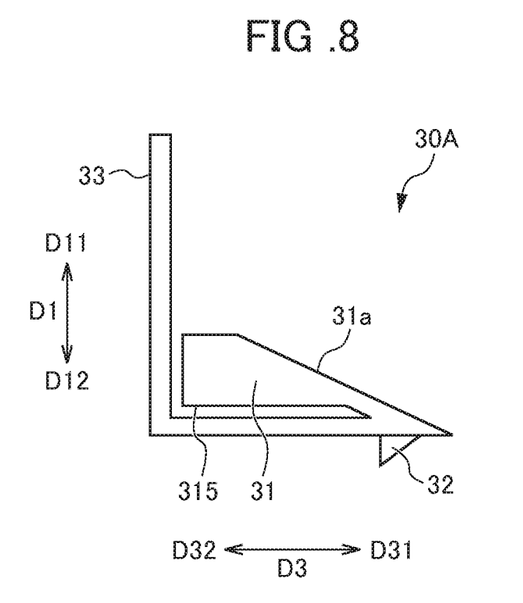
FIG. 8 a side view of a first coil fixing component included in a stator according to another embodiment.

FIG. 8 is a side view of a first coil fixing component 30A included in a stator according to another embodiment. The stator of this embodiment is different from the stator 1 illustrated in FIG. 1 in that the first coil fixing component 30A is provided instead of the first, coil fixing component 30.

As illustrated in FIG. 8, the first coil fixing component 30A includes a first body portion 31. The first body portion 31 has a shape that a slit 31S extending along the radial direction D3 is formed and has elasticity in the axial direction D1. The first body portion 31 of the first coil fixing component 30A has a smaller amount of contraction (a smaller elastic coefficient) in the axial direction D1 than the second body portion 41 of the second coil fixing component 40.

Figure 9:
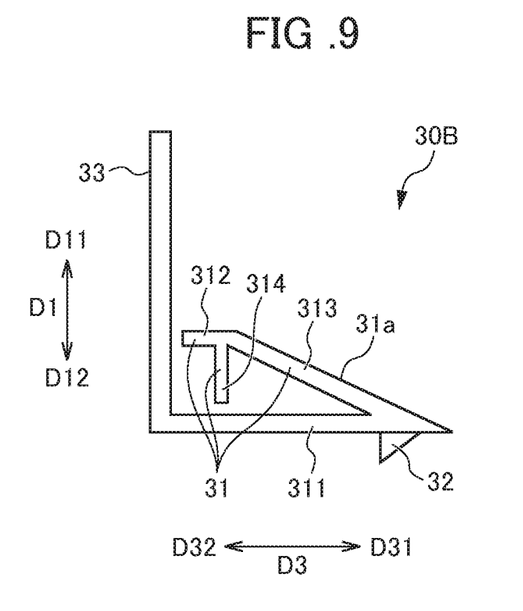
FIG. 9 is a side view of a first coil fixing component included in a stator according to still another embodiment.

Next, a stator according to still another embodiment will be described with reference to FIG. 9. FIG. 9 is a side view of a first coil fixing component 30B included in a stator according to still another embodiment. The stator according to this embodiment is different from the stator 1 illustrated in FIG. 1 in that the first coil fixing component 30B is provided instead of the first coil fixing component 30.

As illustrated in FIG. 9, the first coil fixing component 30B includes a first body portion 31. The first body portion 31 has such a shape that two parallel plate portions 311 and 312 are connected to another plate portion 313 with a gap therebetween and the first body portion 31 has still another plate portion 314 that extends from one plate portion 311 to a position immediately in front of the other plate portion 312 and has elasticity in the axial direction D1. The first body portion. 31 of the first coil fixing component 30B has a smaller amount of contraction (a smaller elastic coefficient) in the axial direction D1 than the second body portion 41 of the second coil fixing component 40. The still another plate portion 314 has a distal end abutting against the other plate portion 312 to thereby restrict the amount of contraction in the axial direction D1 the first body portion 31.

EXPLANATION OF REFERENCE NUMERALS

1: Stator
10: Stator core
11: Yoke portion
12: Tooth portion
12a: First end surface
12b: Second end surface
13: Through-hole (First concave portion, Second concave portion)
20: Coil
20a: Inner circumferential portion
30, 30A, 30B: First coil fixing component
31: First body portion
31a: First guiding portion
32: First convex portion
32a: First auxiliary guiding portion
33: First locking portion
40: Second coil fixing component
41: Second body portion
41a: Second guiding portion
42: Second convex portion
43: Second locking portion
D1: Axial direction
D2: Circumferential direction
D3: Radial direction
SP1: First void portion
SP2: Second void portion

What is claimed is:

1. A stator comprising:
   a stator core having a cylindrical yoke portion and a plurality of tooth portions protruding toward an inner side of a radial direction of the yoke portion from positions spaced from each other in a circumferential direction of an inner circumferential portion of the yoke portion and extending in an axial direction of the yoke portion;
   a plurality of coils attached to the tooth portion so as to surround the tooth portion, the coils forming a first void portion between an inner circumferential portion of the coil and a first end surface on one end side in the axial direction of the tooth portion and forming a second void portion between the inner circumferential portion of the coil and a second end surface on the other end side in the axial direction of the tooth portion;
   a plurality of first coil fixing components inserted into the first void portion from an inner side of the radial direction toward an outer side thereof to fix the coils; and
   a plurality of second coil fixing components inserted into the second void portion from the inner side of the radial direction toward the outer side to fix the coils, wherein
   the first end surface has a first concave portion,
   the second end surface has a second concave portion,
   the first coil fixing component has a first body portion inserted into the first void portion, a first convex portion protruding from a position contacting the first end surface, of the first body portion so as to be inserted into the first concave portion, and a first locking portion extending from an end on the inner side of the radial direction of the first body portion toward the opposite side of the first end surface to lock the coil from the inner side of the radial direction,
   the second coil fixing component has a second body portion inserted into the second void portion, a second convex portion protruding from a position contacting the second end surface, of the second body portion so as to be inserted into the second concave portion, and a second locking portion extending from an end on the inner side of the radial direction of the second body portion toward the opposite side of the second end surface to lock the coil from the inner side of the radial direction,
   the first body portion has a first guiding portion that guides insertion into the first void portion,
   the second body portion has a second guiding portion that guides insertion into the second void portion,
   the first body portion and the second body portion each have a shape that is tapered toward an outer side of the radial direction, and
   at least one of the first body portion and the second body portion has an elastic structure that exerts elastic force in the axial direction.

2. The stator according to claim 1, wherein
   the first convex portion has a first auxiliary guiding portion that assists guiding of the first body portion toward the first void portion by the first guiding portion, or
   the second convex portion has a second auxiliary guiding portion that assists guiding of the second body portion toward the second void portion by the second guiding portion.

3. The stator according to claim 1, wherein
   any one of the first body portion and the second body portion has the elastic structure, and
   the other one of the first body portion and the second body portion does not substantially have the elastic structure.

4. A motor comprising:
   the stator according to claim 1; and
   a rotor disposed on an inner side of the stator.

* * * * *